United States Patent [19]

Symons

[11] 4,441,349
[45] Apr. 10, 1984

[54] METHOD OF MAKING A CAST IRON SEALING RING

[75] Inventor: James D. Symons, Southfield, Mich.

[73] Assignee: General Motors Corporation, Detroit, Mich.

[21] Appl. No.: 440,963

[22] Filed: Nov. 12, 1982

[51] Int. Cl.³ ............................................. B21D 31/06
[52] U.S. Cl. ..................................... 72/53; 29/90 A; 29/156.6; 51/332; 51/419
[58] Field of Search ...................... 72/53, 76; 29/90 A, 29/156.6, 156.7 A; 51/332, 334, 337, 401, 402, 419, 104 R, 105 R, 106 R

[56] References Cited

U.S. PATENT DOCUMENTS

| | | | |
|---|---|---|---|
| 955,471 | 4/1910 | Motz | 51/419 |
| 1,116,776 | 11/1914 | Wilcox | 72/53 |
| 2,968,086 | 1/1961 | Fuchs | 51/419 |
| 3,834,200 | 9/1974 | Winter | 72/53 |
| 3,857,750 | 12/1974 | Winter et al. | 72/53 |
| 4,167,864 | 9/1979 | Taipale | 72/53 |

Primary Examiner—Daniel C. Crane
Assistant Examiner—David B. Jones
Attorney, Agent, or Firm—Donald F. Scherer

[57] ABSTRACT

A method of providing a cold-worked sealing surface on the annular face of an annular seal ring is disclosed. The seal ring is mounted in a rotatable holder with the annular face exposed. While the holder is rotated, a work tool with a plurality of shot-impregnated flaps is also rotated. The axis of rotation of the work tool and holder are displaced 90°. During rotation, the holder and flaps are placed in interfering relationship so that the annular face is cold-worked by the shot-impregnated flaps. The opposite annular face of the seal ring can be worked in the same manner.

2 Claims, 3 Drawing Figures

U.S. Patent    Apr. 10, 1984    4,441,349
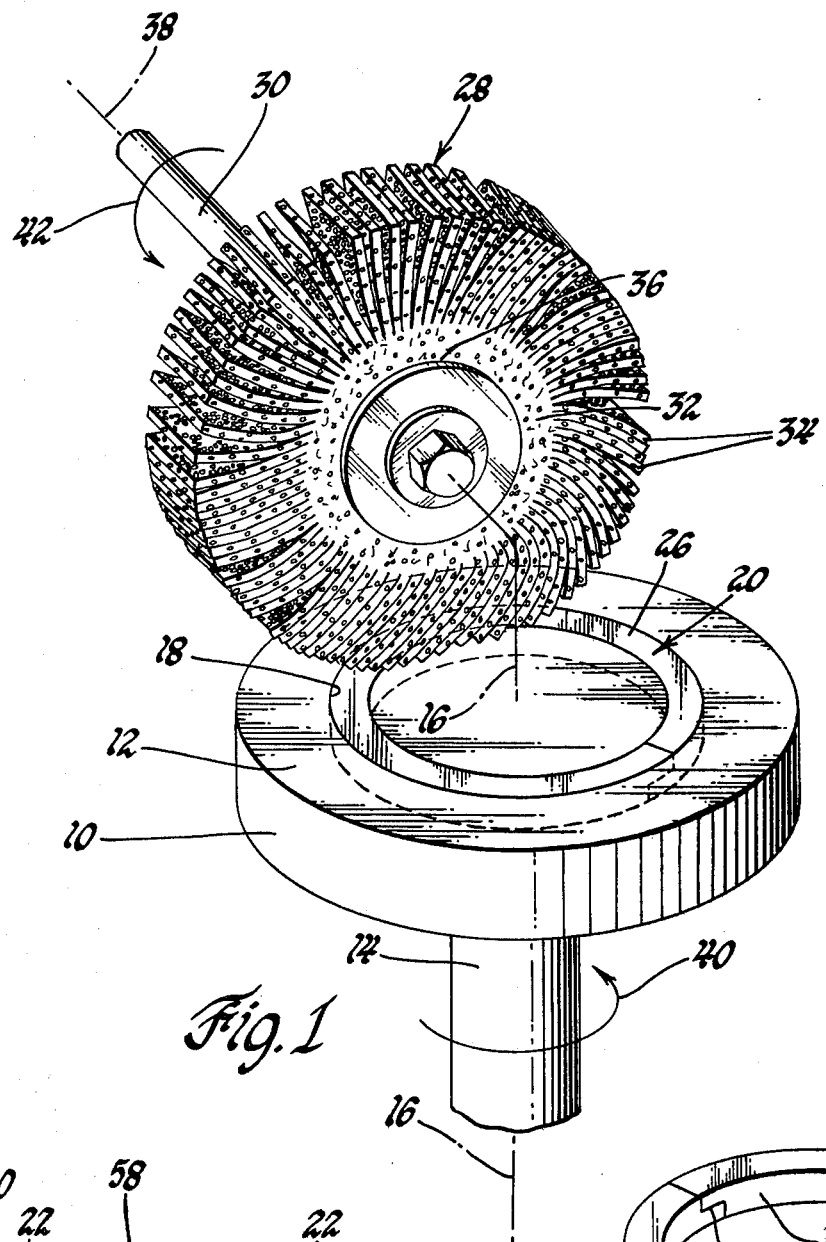
Fig. 1
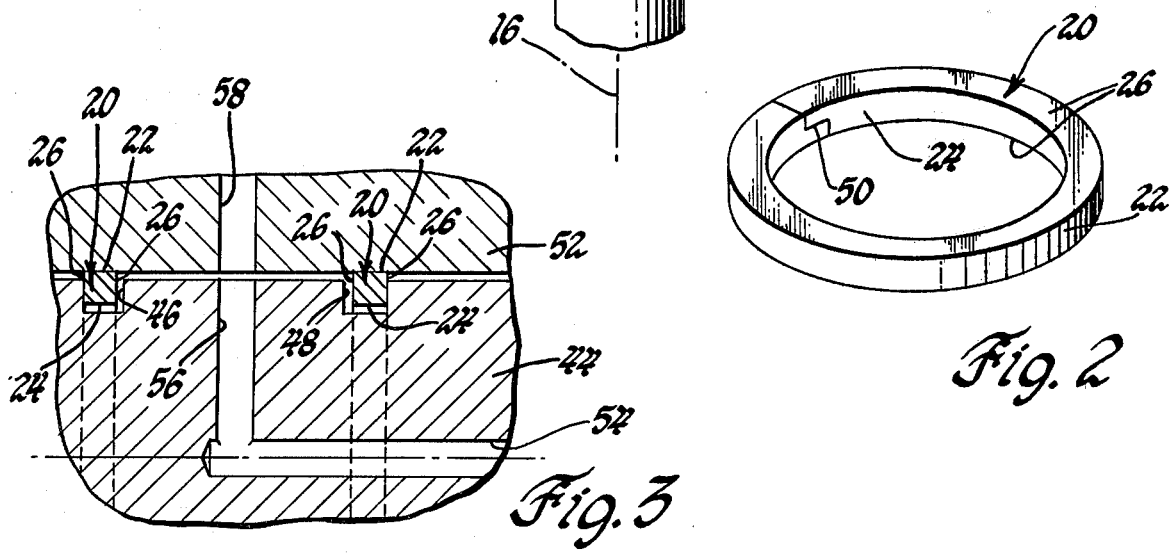
Fig. 3
Fig. 2

METHOD OF MAKING A CAST IRON SEALING RING

This invention relates to seal ring manufacture and more particularly to the surface finish preparation of annular seal rings.

Annular seal rings are quite often used as face seals installed between a stationary housing and a rotatable shaft when it is desirable to transmit fluid under pressure between the shaft and housing. The seal ring is pressurized such that the outer peripheral surface expands outwardly against the stationary housing and one of the annular faces is held in sealing relationship against the rotating shaft.

Generally, the annular seal ring will remain stationary with the housing such that a dynamic sealing relationship exists between the annular surface and the rotating shaft. It is preferable to maintain a hydrodynamic seal at this juncture so that friction forces are reduced and very little wear occurs between the seal ring and the shaft.

Automatic transmissions generally utilize seals, such as those described above, on the transmission input shaft which extends between the torque converter turbine and the input clutch. Many automatic transmissions use a seal member manufactured from a plastic such as tetrafluoroethylene (TFE). While TFE seals provide good wear resistance, the dimensional stability characteristics thereof are such that the leakage occurring at the seal is indeterminate and random. The randomness of this leakage increases the difficulty in providing consistent shift calibrations from transmission to transmission.

It has been found that cast iron seal rings will provide a more consistent leakage pattern such that shift calibration is more consistent. However, cast iron seals generally have high friction losses. The present invention provides an improved method for making the cast iron seals to reduce friction losses. This method provides for an improved surface finish of the annular surface which provides a hydrodynamic sealing relationship with the rotating shaft. Coldworking, accomplished in accordance with the present invention, of this surface provides a surface finish which encourages the development of a hydrodynamic film which reduces the frictional forces thereby improving the overall efficiency of the transmission.

It is therefore an object of this invention to provide an improved method of manufacture for a seal ring having an annular surface adapted to seal against a rotating surface wherein the annular surface is prepared by placing the seal ring in a holder with the annular face exposed and simultaneously rotating on perpendicularly displaced axes both the holder and a work tool which includes a plurality of shot embedded flaps and by placing the work tool flaps in interference relationship with the annular surface during rotation and thereby cold-work the annular surface.

This and other objects and advantages of the present invention will be more apparent from the following description and drawings in which:

FIG. 1 is an isometric view of a diagrammatic representation of the process incorporated in this invention;

FIG. 2 is an isometric view of a sealing member on which the invention may be performed; and FIG. 3 is a partial sectional view of a shaft, housing and seal in operating relationship.

Referring to the drawings, wherein like characters represent the same or corresponding parts throughout the several views, there is seen in FIG. 1 a workpiece holder 10 having a flange 12 and a shaft 14 which are unitarily rotatable about an axis 16. The flange 12 has formed therein a groove 18 in which is disposed a sealing ring 20 such as that shown in FIG. 2. The sealing ring 20, as seen in FIG. 2, has an outer cylindrical surface 22, an inner cylindrical surface 24 and a pair of oppositely disposed annular surfaces such as 26. The ring 20 is placed in the groove 18 such that one of the annular surfaces 26 is in the same plane as the surface of flange 12.

A work tool 28 includes a shaft 30 and a rotatable body 32 which is comprises of a plurality of cast shot embedded flap members 34 and a hub 36. The hub 36 is secured for unitary rotation with the shaft 30 about an axis 38. The axis 38 is perpendicular to the axis 16. The work tool 28 is preferably a Rotopeen (Trademark) wheel which is manufactured and sold by the 3M Company.

During operation, the workpiece holder 10 is rotated in the direction of Arrow 40 and the work tool is rotated in the direction of Arrow 42. As seen in FIG. 1, this will result in the flaps 34 moving in a direction opposite to the annular surface 26. To cold-work the annular surface 26, the flaps 34 are moved into contact with the annular surface 26 such that the cast iron shot members impregnated therein will cause cold-working of the surface 26. During the process, the amount of interference between the flaps 34 and annular surface 26 is controlled so as to effect the proper angle of incidence with which the case iron shot members in flaps 34 strike the annular surface 26. Also controlled during the process is the speed of holder 10, the speed of work tool 28 and the time span during which the flaps 34 are disposed in inteference with the annular surface 26. It is preferable that the cast iron shot size be constant throughout the several flaps.

It has been found that the above parameters, that is, flap interference, machining time, shot size and flap speed should be increased as the hardness of annular surface 26 is increased. As a general rule, the speed of the workpiece holder 10 is maintained constant.

To provide an annular surface having a hardness of 45 $R_c$ with a cold-work surface wherein the slope of the indentation is approximately 2 to 3 degrees, and the radius of curvature of the asperities is approximately 0.2 to 0.3 mm with a roughness width surfacing or wave length of at least 0.25 mm, the following parameters should be maintained:

| | |
|---|---|
| Workpiece Holder Speed | 100 rpm |
| Work Tool Speed | 2800 rpm |
| Interference Amount | 9 to 11 mm |
| Cast Iron Shot Size | #110 |
| Time of Cold-Working | 15 seconds |

With these parameters, it has been found that a satisfactory sealing, low friction face, is obtained.

Tests during which a cold-worked annular surface was rotated against a smooth lapped surface resulted in a 40% reduction in friction as compared to an unworked seal surface.

The seal rings 20 are useful in automatic transmissions where they are installed in a rotating shaft such as 44, shown in FIG. 3. The shaft 44 has a pair of annular grooves 46 and 48 in each of which is disposed the seal ring 20. As seen in FIG. 2, the seal ring 20 has a split 50 which permits such installation. These types of annular rings are well-known. The shaft 44 is disposed in housing 52. The shaft 44 has formed therein an axial fluid passage 54 which communicates with a radial fluid passage 56 through which fluid is directed between the seals 20. A passage 58 formed in the housing 52 is disposed to be in fluid communication with the space between the seals 20. Therefore, the fluid is freely transmitted between the passages and is prevented from escaping by the seals 20. The fluid pressure acts on the one annular surface 26 of each seal and on the inner cylindrical surface 24 of each seal to urge the seal 20 outwardly and axially so that cylindrical surface 22 seals against housing 52 and the other annular surface 26 seals against a portion of the side wall of the respective groove 46 and 48.

During operation, the seal 20 remains stationary in the housing 52 such that there is a relative rotation between shaft 44 and the seals 20. Due to the cold-working of the annular surface 26, as explained above, a hydrodynamic film is generated between the annular surface 26 and the side wall of grooves 46 and 48. It has been found that by utilizing these cast iron seals in commercially available transmissions, that it is possible to reduce the transmission spin losses by approximately 10%. This, of course, results in an overall improvement of transmission efficiency which, of course, results in improved fuel economy for the vehicle. Since either annular surface 26 may be the sealing surface when installed in the groove, it is desirable to cold-work both annular surfaces 26. This is accomplished by cold-working one surface and then inserting the seal ring 20 in the work holder 10 so that the other annular surface 26 can be cold-worked.

The cold-working described above results in a very useful shape in the resultant surface asperities which occur during the cold-working process. Since the cast iron shot is essentially carried by the flap in somewhat of an arc and the surfaces are moving relative to one another, the surface is burnished by the cast iron shot. This burnishing action results in the shallow slope of indentation and a large radius of curvature on the asperities. Such a surface provides a very good hydrodynamic film generating surface.

The embodiments of the invention in which an exclusive property or privilege is claimed are defined as follows:

1. A method of manufacture for a cast iron annular sealing ring adapted to fit a groove on a rotating shaft with the outer peripheral surface in stationary sealing contact against a stationary housing surface and an annular face held by hydraulic fluid in rotary sealing contact with a side wall of the groove, said annular face having a predetermined hardness, the method comprising the steps of:

mounting said annular seal ring in an annular groove formed in a workpiece holder with the annular face thereof exposed;

rotating said workpiece holder in the range of 90 to 110 revolutions per minute;

rotating a work tool, having a plurality of flexible flaps with a plurality of cast shot embedded therein, at a predetermined constant speed on an axis disposed perpendicular to the axis of said workpiece holder;

moving said workpiece holder into the path of the flaps of said work tool a predetermined distance to effect cold-working of the annular face of said seal ring, while maintaining the axis of the tool perpendicular to the workpiece axis and cooperating with said work tool rotation and surface hardness to produce an angle of incidence in the surface in the range of 2° to 3° and asperities with a radius of curvature in the range of 0.2 to 0.3 mm; and retracting said workpiece holder from the path of said flaps.

2. A method of manufacture for a cast iron annular sealing ring adapted to fit a groove on a rotating shaft with the outer peripheral surface in stationary sealing contact against a stationary housing surface and an annular face held by hydraulic fluid in rotary sealing contact with a side wall of the groove, said annular face having a hardness in the range of 45 $R_c$ to 50 $R_c$, the method comprising the steps of:

mounting said annular seal ring in an annular groove formed in a workpiece holder with the annular face thereof exposed;

rotating said workpiece holder in the range of 90 to 110 revolutions per minute;

rotating a work tool, having a plurality of flexible flaps with a plurality of cast shot embedded therein, in the range of 2600 to 3000 rpm on an axis disposed perpendicular to the axis of said workpiece holder;

moving said workpiece holder into the path of the flaps of said work tool a distance in the range of 9 to 11 mm to effect cold-working of the annular face of said seal ring, wherein said cold-working is effected while maintaining the axis of the tool perpendicular to the workpiece axis; and retracting said workpiece holder from the path of said flaps.

* * * * *